United States Patent [19]
Higuchi et al.

[11] Patent Number: 5,887,964
[45] Date of Patent: Mar. 30, 1999

[54] SURFACE LIGHT SOURCE DEVICE AND LIQUID CRYSTAL DISPLAY

[75] Inventors: Eizaburo Higuchi, Setagaya-ku; Yasuhiro Koike, 534-23, Ichigao-cho, Aoba-ku, Yokohama-shi, Kanagawa, both of Japan

[73] Assignees: Nitto Jushi Kogyo Kabushiki Kaisha, Tokyo; Yasuhiro Koike, Kanagawa, both of Japan

[21] Appl. No.: 809,890

[22] PCT Filed: Jul. 30, 1996

[86] PCT No.: PCT/JP96/02151

§ 371 Date: Jun. 9, 1997

§ 102(e) Date: Jun. 9, 1997

[87] PCT Pub. No.: WO97/05522

PCT Pub. Date: Feb. 13, 1997

[30] Foreign Application Priority Data

Aug. 1, 1995 [JP] Japan .................................. 7-213964

[51] Int. Cl.[6] .................................................... F21V 13/04
[52] U.S. Cl. .............................. 362/31; 362/26; 362/330; 362/333; 362/339; 349/65
[58] Field of Search .................................. 362/26, 27, 31, 362/330, 333, 339; 349/64, 65, 66, 67

[56] References Cited

U.S. PATENT DOCUMENTS

| | | | |
|---|---|---|---|
| 4,120,018 | 10/1978 | Nagel | 362/333 |
| 5,136,480 | 8/1992 | Pristash et al. | 362/31 |
| 5,396,350 | 3/1995 | Beeson et al. | 349/65 |
| 5,408,388 | 4/1995 | Kobayashi et al. | 362/31 |

FOREIGN PATENT DOCUMENTS

| | | |
|---|---|---|
| 0 588 504 A | 3/1994 | European Pat. Off. . |
| 6-222207 | 8/1994 | Japan . |
| 6-324205 | 11/1994 | Japan . |
| 7-1427 | 1/1995 | Japan . |
| 7-198913 | 8/1995 | Japan . |
| 7-270708 | 10/1995 | Japan . |
| WO 94 20871 A | 9/1994 | WIPO . |
| WO 96 10148 A | 4/1996 | WIPO . |

*Primary Examiner*—Alan Cariaso
*Attorney, Agent, or Firm*—Staas & Halsey

[57] ABSTRACT

There is provided a surface light source device which is excellent in whiteness and softness of a luminant surface and able to retain reflective appearance from occurring. The surface light source device is effectively applied to back lighting in a liquid crystal display. A fluorescent lamp (L) is disposed in the vicinity of an incidence surface (2) of a light guide plate (1). A prism sheet (4') having prism surfaces formed on both surfaces is disposed along an exiting surface (5). The prism sheet (4') is oriented such that prism rows (4a, 4b) on the inside surface run in the transverse direction of the light guide plate (1) while prism rows (4c, 4d) on the outside surface run in the longitudinal direction of the light guide plate (1). A reflector (3) is disposed along a back surface (6) of the light guide plate (1). Light emitted from the exiting surface (5) is led to the frontal direction by the action of the prism rows (4a, 4b) and then returned toward the light guide plate (1) after having been shifted in the transverse direction by the prism rows (4c, 4d). The history of a path of light emitted from the prism sheet (4') is diversified through this process, thereby improving visual characteristics.

8 Claims, 7 Drawing Sheets

SURFACE LIGHT SOURCE DEVICE AND LIQUID CRYSTAL DISPLAY

TECHNICAL FIELD

This invention relates to a surface light source device and a liquid crystal display, and more specifically, to a surface light source device utilizing a light guide plate made of light scattering and guiding material and a prism sheet, and a liquid crystal display with the surface light source device applied to back lighting.

BACKGROUND

A surface light source device utilizing a light guide plate made of light scattering and guiding material and a prism sheet has been proposed and applied to back lighting for a liquid crystal display and the like.

The prism sheet is a sheet-like member made of optical material, which has a surface provided with a large number of V-shaped groove rows, that is, a prism surface. It is known that this element has a function to alter the propagation-directional characteristics of luminous flux.

FIG. 1 shows the most general usage of a prism sheet in a surface light source device provided with a light guide plate made of light scattering and guiding material. Referring to FIG. 1, a light guide plate 1 made of light scattering and guiding material has a wedge-shaped section. The light scattering and guiding material may be obtained by uniformly distributing a substance of different refractive index in a matrix made of polymethyl methacrylate (PMMA), for instance.

The side end surface on the thick side of the light guide plate 1 serves as an incidence surface 2 and a light source element (a fluorescent lamp) L is disposed in the vicinity of the incidence surface.

A reflector 3 is disposed along one surface (a back surface 6) of the light guide plate 1. For the reflector 3, a regular-reflective silver foil sheet or a diffuse-reflective white sheet is used. An illumination flux is emitted from the other surface (an exiting surface 5) of the light guide plate 1. A prism sheet 4 is disposed on the outside of the exiting surface 5.

In FIG. 1, the gap between the prism sheet and the light guide plate 1, the pitch of prism rows and the depth of prism and others are exaggerated for the sake of illustration. One surface of the prism sheet 4 is composed of V-shaped prism surfaces 4a, 4b, and the other surface is a flat surface 4e.

In the prism sheet 4 disposed as shown in FIG. 1, the flat surface 4e faces the outside and serves as a luminant surface 4e, from which an illumination flux 4f is emitted. If a well-known liquid crystal display panel is disposed further outside the prism sheet 4, a liquid crystal display of back lighting type is constituted.

As the result of repetitive reflection occurring in the wedge-shaped section of the light guide plate 1, such a surface light source device shows excellent characteristics for the efficiency of light utilization and the uniformity in luminance.

Light introduced from the light source element L into the light guide plate 1 is guided toward an end surface 7 on the thin side, while being affected by a scattering action and a reflecting action in the light guide plate 1. In the process, the light is emitted little by little from the exiting surface 5. The light emitted from the exiting surface 5 has directivity according to the size of particles of different refractive index distributed in the light guide plate 1 (more generally speaking, according to the correlation distance in a structure having uneven refractive index). In other words, the illumination flux emitted from the exiting surface 5 assumes a parallel luminous flux.

The larger the size of the particles of different refractive index distributed in the light guide plate 1 is (more generally speaking, the more the correlation distance is), light emitted from the exiting surface 5 is parallelized more clearly. The preferential propagation direction (the main propagation direction of illumination flux) is generally inclined at an angle ranging from about 25° to 300° with respect to the exiting surface as viewed from the side of the incidence surface 2.

On the basis of the above fact, a description will now be given on a function to alter the propagation directional characteristics of the prism sheet 4 in the conventional surface light source device with reference to FIGS. 2 and 3.

FIG. 2 is a view for explaining the behavior of light on a section along "a longitudinal direction" in the structure shown in FIG. 1. In FIG. 2, "a longitudinal direction" means a direction parallel to a light supply direction toward the light guide plate 1, in other words, a direction perpendicular to a running direction of the incidence surface 2. On the other hand, "a transverse direction" means a direction perpendicular to the light supply direction toward the light guide plate 1, that is, the running direction of the incidence surface 2.

As shown in FIG. 2, the prism sheet 4 is disposed along the exiting surface 5 of the light guide plate 1 50 that the prism surface is directed inward. An vertical angle φ3 of each prism element on the prism surfaces is preferably about 600°.

As described above, when the light supply direction is expressed by an arrow L', the preferential propagation direction of luminous flux emitted from the exiting surface 5 is inclined at an angle φ2 of about 60° with respect to a normal extending from the exiting surface 5. When a refractive index of the light guide plate 1 (PMMA matrix) is assumed to be 1.492, the angle φ1 of incidence with respect to the exiting surface 5 to provide the angle φ2 of about 60° is about 35°. A beam which meets such conditions is called a typical beam. In FIG. 2, the typical beam is denoted by a reference numeral B1.

The typical beam B1 emitted from the exiting surface 5 makes a straight propagation through an air layer AR (having a refractive index n0 of approximately 1.0), and thereafter, is incident on the prism surface 4a of the prism sheet 4 at an angle (φ3 of about 60°) close to a perpendicular. It is to be noted that the quantity of light incident on the prism surface 4b on the opposite side is relatively very small.

Subsequently, the typical beam B1 makes a substantially straight propagation through the prism sheet 4 up to the prism surface 4b to be regularly reflected toward the flat surface 4e of the prism sheet 4, impinging on the flat surface 4e at an angle close to a perpendicular to be emitted to the outside. The preferential propagation direction of luminous flux emitted from the exiting surface 5 is altered into a direction substantially perpendicular to the exiting surface 5 through the above process.

However, it is to be noted that the altered preferential propagation direction is not always accurately perpendicular to the exiting surface 5. Namely, the altered preferential propagation direction may be adjusted within a range of angles to some extent through design of the vertical angle φ3, material (refractive index) of the prism sheet 4 and material (refractive index) of the light guide plate 1 and others.

FIG. 3 is a sectional view for explaining the behavior of light in another conventional structure utilizing the prism sheet 4. Compared with the structure shown in FIGS. 1 and 2, the prism sheet 4 is reversed so that the prism surface face is directed inwardly.

The vertical angle $\phi 4$ of each prism element consisting of the prism surfaces may be about 70°, for instance. In the structure, in which the prism surfaces face outside, an vertical angle to provide desired effects ranges more widely than that in the structure, in which the prism surfaces face inside.

When the light supply direction is expressed by an arrow L', a typical beam B2 is incident on the exiting surface 5 at an angle $\phi 1$ of about 35°, and most of the typical beam is emitted to an air layer AR (having a refractive index n0 of approximately 1.0), similarly to the case of FIG. 2. An angle $\phi 2$ of emission comes to about 60°.

The typical beam B2 makes a straight propagation through the air layer AR and is diagonally incident on the flat surface 4e of the prism sheet 4, making propagation through a refractive path as shown in FIG. 3. Then, the typical beam is emitted from the surface 4c of the prism sheet 4 at an angle close to a perpendicular to the exiting surface 5. It is to be noted that the ratio of beam emitted from the surface 4d is relatively very small. Since the path of light after having been incident on the flat surface 4e varies depending on a refractive index n2 of the prism sheet 4 or a prism vertical angle $\phi 4$, the preferential propagation direction may be adjusted by adjusting these parameters.

The surface light source devices of such conventional types are excellent in that a thin structure is realized, and that a uniform and bright illumination flux is provided so as to preferentially make propagation in a desired direction.

However, demands on a liquid crystal display of back lighting type have been recently more exacting. Namely, not only a thin structure, a large image area and power-saving properties, but also a visual feeling of high quality has been highly required.

The surface light source devices of conventional types described above do not sufficiently meet such requirements. In particular, the surface light source devices of conventional types do not reach the stage of simultaneously satisfying the level and uniformity of brightness and the sense of softness when the luminant surface (the top surface of the prism sheet) is viewed with the naked eye.

Namely, in the prior art, it is not possible to provide a surface light source device having a luminant surface which is fine and has sufficient whiteness without glaring. Further, irregularities in luminance called a reflective appearance occurs in the exiting surface in the vicinity of the incidence surface, resulting in degradation of display quality.

It is supposed that visual quality is degraded due to the causes as follows. Generally, scattering power of the light guide plate 1 in the surface light source device shown in FIG. 1 is not intensive enough to allow clear observation. The reason is that such enough intensive scattering power given to the light scattering and guiding material, the light scattering and guiding material reduces light guiding capacity and is hard to meet the requirements that the luminance of the luminant surface should be uniform. This tendency becomes more remarkable according as the size of the light guide plate (namely, the size of the luminant surface or the size of an image plane of a liquid crystal display) is increased.

Therefore, as far as it judges from a visual point of view, it is not possible to expect an intensive light diffusing action inside the light guide plate 1. As a result, it is supposed that a remarkable quantity of light reflected from the reflector 3 disposed along the back surface of the light guide plate 1 reaches observer's eyes without undergoing sufficient diffusion.

In other words, the ground of the reflector 3 has a tendency to be seen by the observer's eyes. Accordingly, if a regular-reflective reflector 3 is used, undesirable visual feeling peculiar to a regular reflection surface, that is, insufficiency of so-called "whiteness" or that of so-called "softness", or "glaringness" is caused inevitably.

Further, since less diffused light is transmitted through the prism sheet, rows of prism grooves defined by the prism surfaces may be observed as stripes.

Further, insufficient diffusion of light occurs particularly in a portion close to the incidence surface, and a phenomenon of so-called reflective appearance is caused, resulting in exerting a bad influence on the display quality of a liquid crystal display.

It is supposed that such phenomena and a resultant undesirable sense affecting an observer are caused by not only the level of the light quantity but also a combination of related factors such as color temperature and propagation directional characteristics of illumination flux.

When a diffuse-reflective white sheet is used for the reflector 3, a visual problem is association with "whiteness" is dissolved to some extent. However, when the reflector 3 is formed to have a diffuse-reflective surface, such a reflector exerts a bad influence on the level and uniformity of the general luminance of the luminant surface.

Further, when some irregularities (i.e., local wrinkles or irregularities) are existent on the surface of the reflector 3 in the case where either of the regular-reflective or diffuse-reflective reflector is used, these irregularities are seen through the reflector, and therefore, the degradation of visual quality may occur.

For solving the above problems, the present inventors have previously proposed a structure, in which an additional prism sheet is disposed along the back surface of a light guide plate made of light scattering and guiding material, in addition to a prism sheet disposed along an exiting surface of the light guide plate (PCT/JP96/00561).

According to the above proposal, the additional prism sheet is disposed along the back surface of the light guide plate such that the prism rows run in parallel with the light supply direction. This surface light source device effectively solves the above problems. However, it is unsatisfactory from the viewpoint of a thin structure and the reduction of manufacturing cost that an additional prism sheet is required in addition to the prism sheet disposed along the exiting surface.

DISCLOSURE OF THE INVENTION

The present invention is made to overcome the defects in the prior art. Namely, an object of the present invention is to provide a surface light source device, which has a luminant surface to provide satisfactory visual feeling ("whiteness" and "softness" or the like) without increasing the number of parts and also without degrading the level and uniformity of brightness.

In addition, on the basis of the surface light source device described above, its object, is to provide a liquid crystal display which is excellent in not only power-saving properties but also visual quality.

The above objects may be attained by improving a surface light source device comprising a light guide plate made of light scattering and guiding material, a light source means for supplying light from at least one side direction of the light guide plate, a reflector disposed along a back surface of the light guide plate, and a prism sheet disposed along an exiting surface of the light guide plate.

This improvement of the surface light source device is characterized by the following means (1) to (5) with respect to the configuration and posture in disposition of the prism sheet.

(1) The prism sheet has an outside prism surface and an inside prism surface respectively provided with a large number of prism rows. Namely, both surfaces of the prism sheet respectively serve as a prism surface. In this specification, the outside prism surface means the surface relatively far from the light guide plate, and the inside prism surface means the surface relatively close to the light guide plate.

(2) The prism rows formed on the inside prism surface run in a transverse direction (a direction parallel to an incidence surface).

(3) Each prism row formed on the inside prism surface has such a prism vertical angle that light emitted obliquely from the light guide plate is led to around a frontal direction inside the prism sheet.

(4) The prism rows formed on the outside prism surface run in a longitudinal direction (a direction perpendicular to the incidence surface).

(5) Each prism row formed on the outside prism surface has such a prism vertical angle that beams led to around the frontal direction inside the prism sheet are returned after having been shifted in the substantially transverse direction. Such a prism vertical angle is typically 90°, as a matter of course. However, this prism vertical angle may be actually within the range of about 70° to 130°.

The light guide plate used in the surface light source device of the present invention preferably has a wedge-shaped section, and in this case, the light supply means is disposed along the end surface on the thick side of the light guide plate.

When the surface light source device described above is disposed behind a liquid crystal display according to a well-known arrangement, a liquid crystal display excellent in not only power-saving properties but also visual quality is provided.

According to the present invention, the luminant surface of high quality from the visual point of view is realized only by simply improving the configuration and disposition of the prism sheet used in the surface light source device of conventional type shown in FIG. 1. Further, the visual quality of a liquid crystal display is heightened by applying the surface light source device to back lighting in the liquid crystal display.

In the present invention, any additional prism sheet is not required. In the prism sheet used in the present invention, the prism rows are formed on both surfaces of the prism sheet so as to run in the directions perpendicular to each other. The prism sheet is oriented such that the inside prism rows run in the transverse direction, and the outside prism rows run in the longitudinal direction.

As seen from the description in association with FIG. 2, directional light (represented by a typical beam) emitted obliquely from the exiting surface of the light guide plate may be led to the frontal direction inside the prism sheet by properly adjusting the prism vertical angle on the inside prism surface.

In the surface light source device of the prior art shown in FIG. 1, the typical beam is directly emitted from the flat outside surface. On the other hand, in the prism sheet used in the present invention, a considerable part of light incident on the outside prism surface through the inside of the prism sheet is inverted after having been shifted in the transverse direction, and then returns toward the inside prism surface.

The actual luminous flux emitted from the exiting surface makes propagation while spreading at an angle to some extent around the typical beam. As analogized from the description in association with FIG. 3, the outside prism surface has the effect of collecting a luminous flux of such light to the frontal direction transversely. This fact contributes to the enhancement of brightness of the luminant surface as viewed from the frontal direction.

The returning typical beam is converted into light distributed around the typical beam in a certain ratio through various paths, and thereafter, is emitted from the outside surface of the prism sheet.

The history of light finally emitted from the outside surface of the prism sheet is diversified on the basis of the function of restraining the typical beam from being directly emitted. As a result, the visual feeling is improved, while the reflective appearance is restrained from occurring in the vicinity of the incidence surface.

BEST MODE FOR EMBODYING THE PRESENT INVENTION

Figure 1:
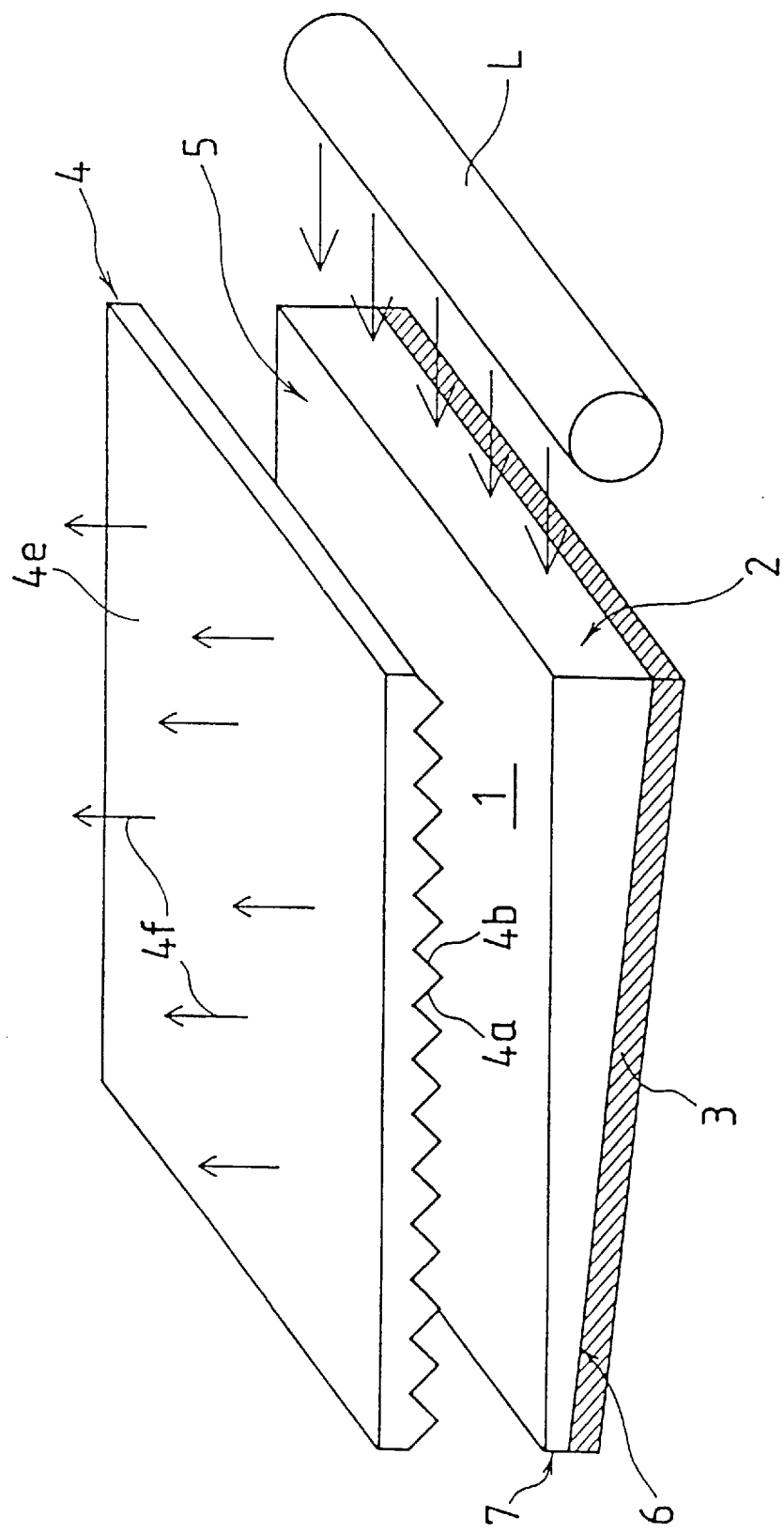
FIG. 1 is a sketch showing the essential structure of a surface light source device in a prior art.
Figure 4:
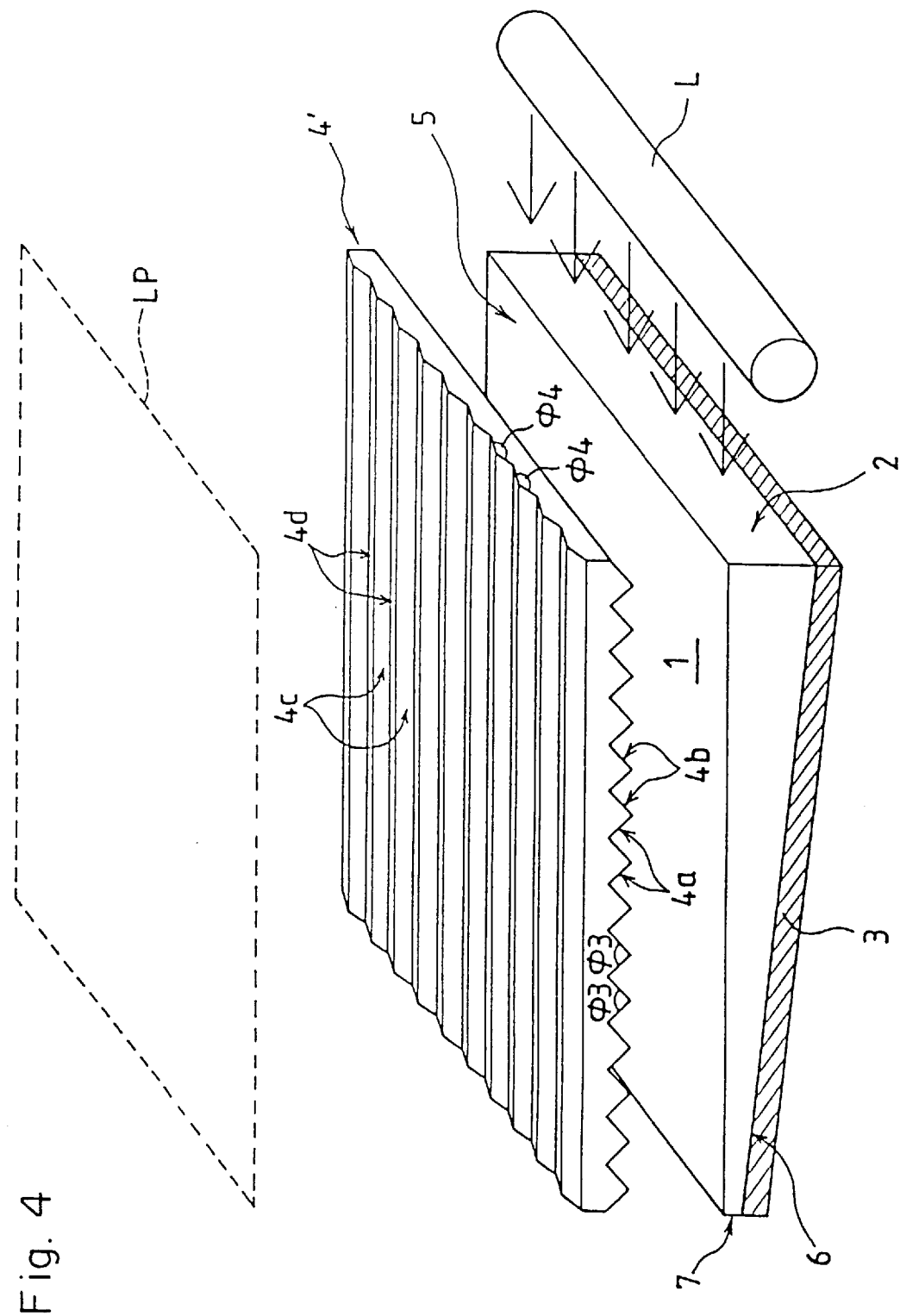
FIG. 4 is a sketch showing an embodiment according to the present invention.

FIG. 4 shows an embodiment of the present invention appropriately by the use of reference numerals common to those in FIG. 1. For the sake of illustration, the interval between a light guide plate and a prism sheet, pitch of prism rows and depth of prism and so forth are exaggerated.

A surface light source device of the present invention has a structure, in which a prism sheet 4' is used in place of a prism sheet 4 in a surface light source device of conventional type shown in FIG. 1.

Namely, the end surface on the thick side of the a light guide plate 1 having a wedge-shaped section serves as an incidence surface 2, and a light source element (a fluorescent lamp) L is disposed in the vicinity of the incidence surface. Although not shown, a reflector such as silver foil is usually disposed so as to surround the light source element (the fluorescent lamp ) L from the back surface side. For the reflector 3 disposed along the back surface 6 of the light guide plate 1, a regular-reflective silver foil or diffuse-reflective white sheet is used.

An illumination flux is taken out from the exiting surface 5 on the other side of the light guide plate 1. The prism sheet 4' is disposed along the exiting surface 5. Similarly to the case of the conventional surface light source device, when a well-known liquid crystal display panel LP (shown by broken lines) is disposed on the outside of the prism sheet 4', a liquid crystal display is constituted.

Similarly to the surface light source device shown in FIG. 1, the thickness of the light guide plate 1 is made smaller according as the light guide plate 1 is apart from the incidence surface 2. This fact is advantage of producing the effect of repetitive reflection between the exiting surface 5 and the inclined back surface 6 to highly hold the efficiency of light utilization and the uniformity of luminance.

Light introduced from the light source element L into the light guide plate 1 is guided toward the end surface 7 on the thin side while being affected by a scattering action and a reflecting action in the light guide plate 1. In this process, light is emitted little by little from the exiting surface 5. The light emitted from the exiting surface 5 has directivity according to the size of particles of different refractive index distributed in the light guide plate 1 (more generally speaking, according to correlation distance relating to unevenness in refractive index). In other words, the illumination flux emitted from the exiting surface 5 assumes the properties of parallel luminous flux.

The larger the size of the particles of difference refractive index distributed in the light guide plate 1 is (the more the correlation distance is), the light emitted from the exiting surface 5 is parallelized more clearly. The preferential propagation direction (a main propagation direction of illumination flux) is generally inclined at an angle ranging from 25° to 30° with respect to the exiting surface as viewed from the side of the incidence surface 2.

The light guide plate 1 may be made of light scattering and guiding material obtained by uniformly distributing a substance of different refractive index (i.e., fine particles of silicone) into a matrix made of polymethyl methacrylate (PMMA). Scattering power of the light guide plate 1 may be adjusted by varying the ratio of content (wt. %) of the substance of different refractive index.

In general, the relatively larger the longitudinal size of the light guide plate 1 is, the ratio of content of the substance of different refractive index is designed to be relatively smaller. When excessive scattering power is given to the light guide plate 1 by providing the ratio of a high content, the propagation of light to a portion distant from the incidence surface 2 is hindered, and there is a fear of producing a gradient of brightness in the surface light source device.

On the other hand, the size of the particles of different refractive index is a factor which influences the intensity of forward scattering properties for individual scattering within inside the light guide plate 1. In general, the larger the particle size is, the forward scattering properties become more intensive. In association with this fact, the relatively larger the particle size is, the preferential propagation direction of luminous flux emitted from the exiting surface 5 of the light guide plate 1 becomes more clearly. Namely, a luminous flux close to a parallel luminous flux may be obtained. On the other hand, the relatively smaller the particle size is, the directivity of luminous flux emitted from the exiting surface 5 of the light guide plate 1 is more reduced. Therefore, the particle size is preferably adjusted according to the intensity of directivity required for the illumination flux.

Description will now be on the structure of the prism sheet 4' providing the most important feature of the present invention and on the behavior of light based on the structure of the prism sheet.

As shown in FIG. 4, prism rows respectively consisting of prism surfaces 4a, 4b as repetitive units are formed on the inside surface of the prism sheet 4'. On the other hand, prism rows respectively consisting of prism surfaces 4c, 4d as repetitive units are formed on the outside surface.

The prism rows formed on the inside surface run in parallel to the running direction of the incidence surface 2 similarly to the case of the prism sheet 4 shown in FIG. 1. On the other hand, the prism rows formed on the outside surface run perpendicularly to the running direction of the incidence surface 2.

Figure 2:
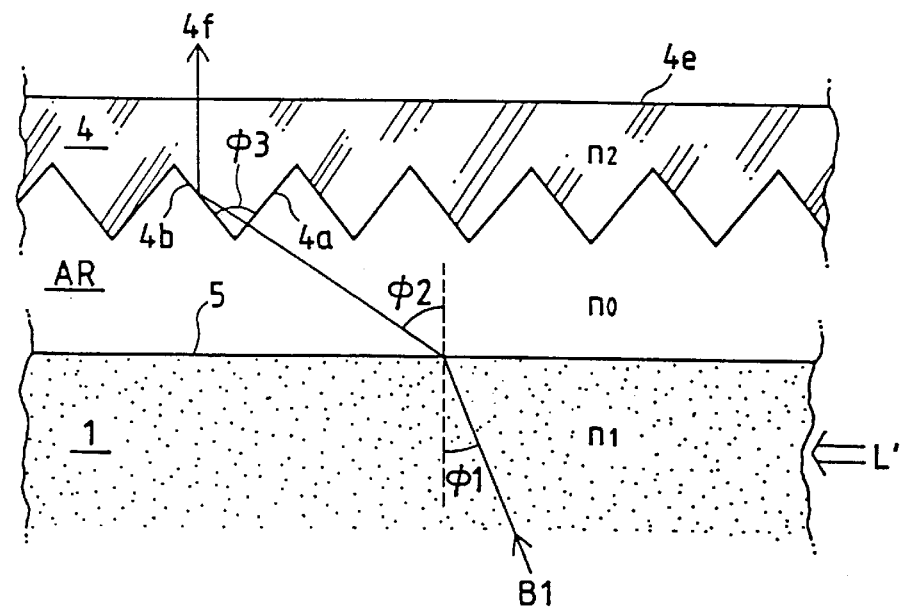
FIG. 2 is a view for explaining the behavior of light in a section along a longitudinal direction in the disposition shown in FIG. 1.
Figure 3:
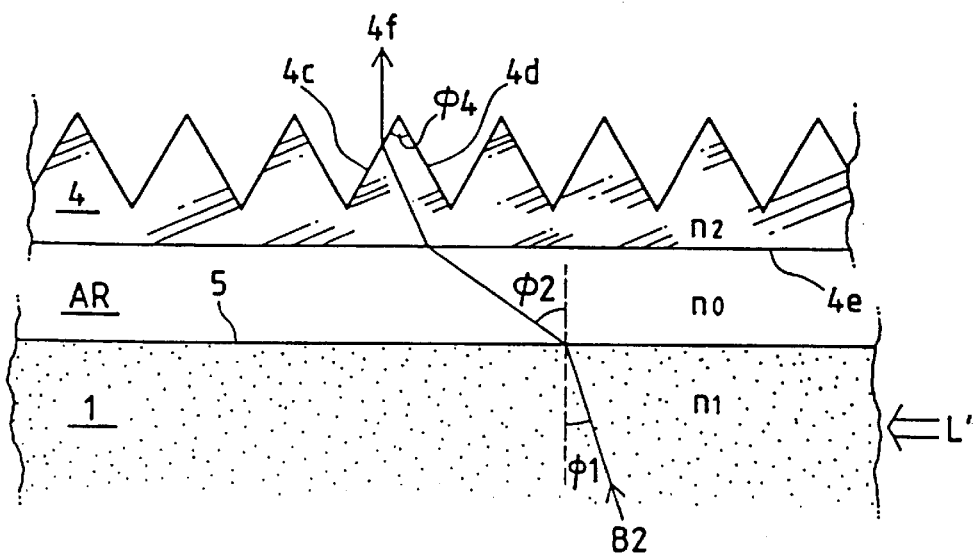
FIG. 3 is a sectional view for explaining another disposition of a prism sheet in a prior art.

As seen from the description in association with FIG. 2, a typical beam representing directional light emitted from the exiting surface of the light guide plate may be led to the frontal direction inside the prism sheet by properly designing a prism vertical angle on the prism surfaces formed on the inside surface.

For instance, when φ2 of the preferential propagation direction of light emitted from the exiting surface 5 of the light guide plate 1 is assumed to be about 60° (refer to FIG. 2), a typical beam making propagation around the frontal direction toward the outside surface through within the prism sheet 4' is generated by setting prism vertical angle φ3 made by the prism surfaces 4a, 4b to be about 60°.

Figure 5:
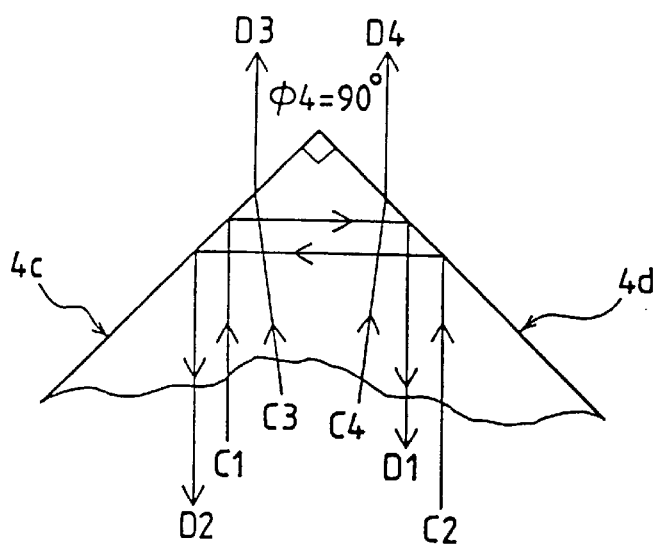
FIG. 5 is a view for explaining the behavior of light around the outside surface of a prism sheet when a prism has, a proper vertical angle $\phi 4$.

FIG. 5. is a view for explaining the behavior of light around the outside surface of the prism sheet 4'. In FIG. 5, a section of a unit of prism rows as viewed from the side of the light source element L is shown and typical beams making propagation in the frontal direction toward the outside surface through the inside of the prism sheet 4' are denoted by C1, C2.

When each prism vertical angle φ4 of the prism rows on the outside surface is assumed to be about 90°, the whole or most of the typical beams C1, C2 is internally reflected (usually totally reflected) at the prism surfaces in order of 4c to 4d, or in order of 4d to 4c, thereby being shifted in a lateral direction, and thereafter, altered into returning beams D1, D2.

Figure 7:
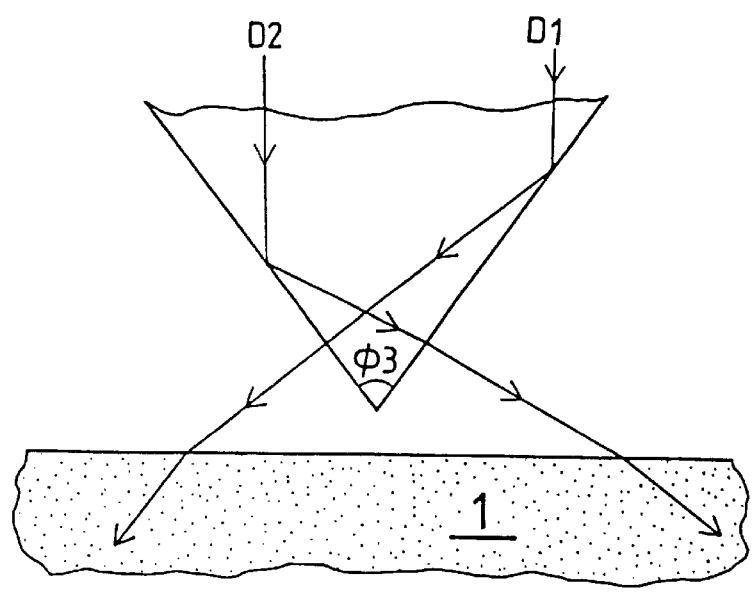
FIG. 7 is a view for explaining the behavior of returning beams D1, D2 around the inside surface.

FIG. 7 is a view for explaining the behavior of these returning beams D1, D2 around the inside surface and a section of a unit of prism rows as viewed from a lateral direction (a section similar to that in FIG. 2) is shown. As shown in FIG. 7, most part of returning beams D1, D2 returns to the inside of the light guide plate 1 according to a light returning rule.

The light having returned to the inside of the light guide plate 1 undergoes again scattering inside the light guide plate 1 and a reflecting action due to the back surface 6 or the reflector 3, then being emitted from the exiting surface 5 of the light guide plate 1. This light is again incident on the prism sheet 4'.

Since the light path in such a process is extremely diversified, considerable spread of light occurs in the propagation direction of light incident again on the prism sheet 4'. Accordingly, the corresponding part of light incident again is incident on the prism surface 4c or 4d from a slightly diagonal direction as beams shown by C3, C4, and is then emitted as beams D3, D4 in the frontal direction.

In this manner, the most intensive propagation direction component of light incident on the prism sheet 4' is restrained from being directly emitted from the prism sheet 4'. As a result, with respect to any small area on the outside surface of the prism sheet 4', the history of path of the light to be emitted from the small area in the frontal direction is diversified, thereby producing a uniform and soft illumination flux.

Particularly, in a portion close to the incidence surface 2, the irregularities in luminance due to the reflective appearance may be prevented from occurring by restraining the most intensive propagation direction component of light from being directly emitted.

In FIGS. 5 and 7, description has been on a case where the propagation directions of the typical beams C1, C2 are accurately directed in the frontal direction and the prism vertical angle $\phi 4$ is accurately 90°. However, even if the propagation directions of the typical beams C1, C2 or the prism vertical angle $\phi 4$ is off from these conditions to some extent, it is possible to sufficiently expect similar effects.

In view of such a situation, the practical range of the prism vertical angle $\phi 4$ is 70° to 130°. A prism vertical angle of less than 70° would reduce the condensing effect of gathering the propagation directions of light around the frontal direction on a plane in a transverse direction, degrading the luminance of the surface light source device.

Figure 6:
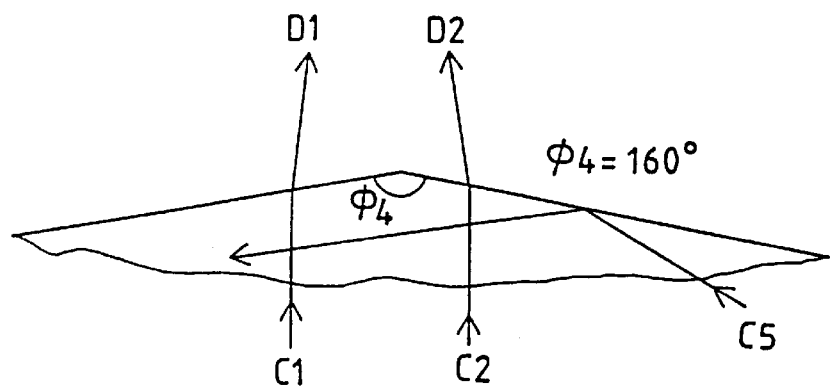
FIG. 6 is a view for explaining the behavior of light around the outside surface of a prism sheet when a prism has an excessive vertical angle $\phi 4$.

On the other hand, an excessive prism vertical angle $\phi 4$ would cause most of the typical beams C1, C2. directing to around the frontal direction to be emitted from the prism surfaces 4c, 4d as they are, providing poor diversification of the history of path of the light emitted from the prism sheet 4'. FIG. 6 shows this manner by taking a case where $\phi 4$ is 160°. As shown in FIG. 6, most of the typical beams C1, C2 making propagation to around the frontal direction is emitted from the prism surfaces 4c, 4d as the emission beams D1, D2 as they are. Then, only diagonally incident light denoted by reference numeral C5 returns due to total reflection, and this fact makes a small contribution toward diversifying the history of the path of light emitted from the prism sheet 4'.

Although the description has been on the embodiments shown in FIGS. 4, 5 and 7 in detail, the present invention is not limited to them. For instance, various modifications are allowed in the shape of the light guide plate 1, in the number and configuration of the light source element L or the like. These modifications will now be briefly given with reference to partial sketches in FIGS. 10 to 13. Incidentally, the detailed description of the structure, disposition and function of each component of the surface light source is not repeated.

Figure 10:
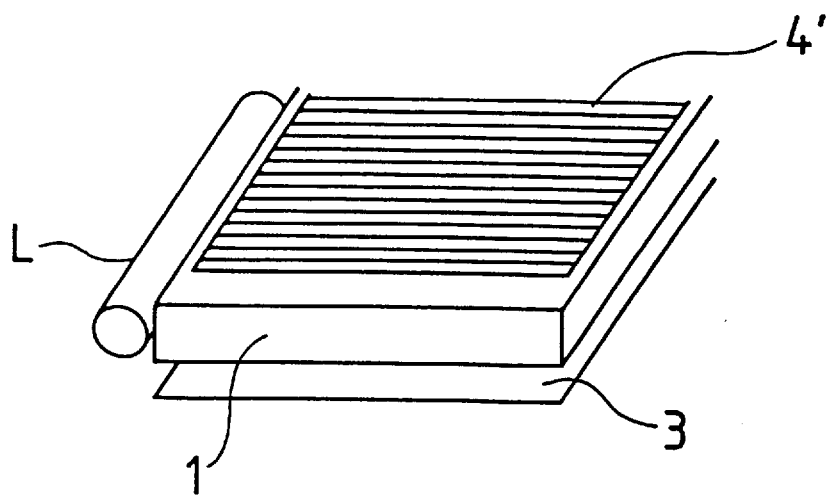
FIG. 10 is a partial sketch for explaining a modification of the embodiment according to the present invention.

First, in a modification shown in FIG. 10, a flat light guide plate 1 of a uniform thickness is used and a light source element L is disposed on one side end surface of the light guide plate. This modification is different from the embodiment shown in FIG. 4 only in the sectional shape of the light guide plate 1.

Figure 11:
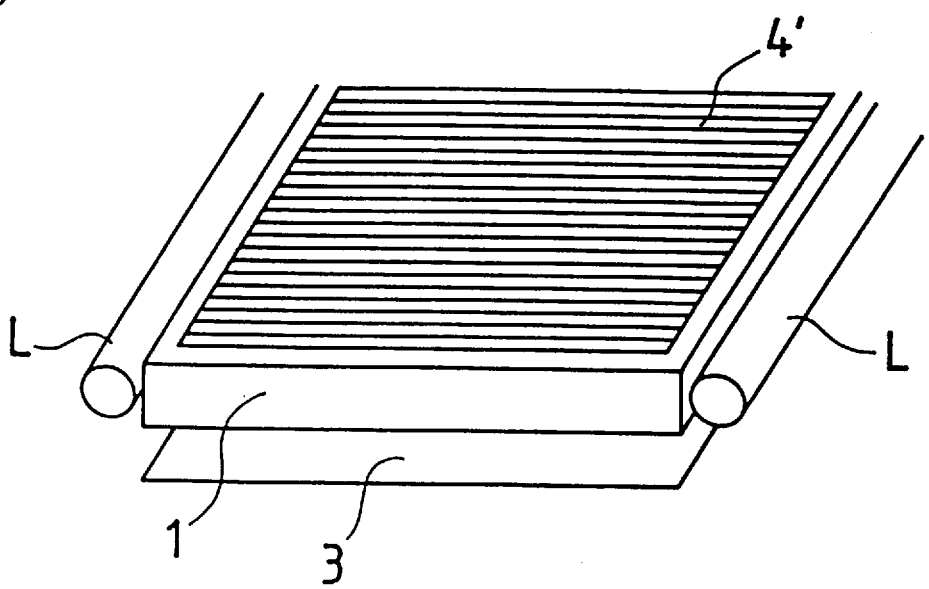
FIG. 11 is a partial sketch for explaining another modification of the embodiment according to the present invention.

In a modification shown in FIG. 11, a flat light guide plate 1 of a uniform thickness is used and two light source elements L in total are disposed on the opposite end surfaces of the light guide plate. This modification is different from the embodiment shown in FIG. 4 in the sectional shape of the light guide plate 1, the disposition and number of light source elements L.

Figure 12:
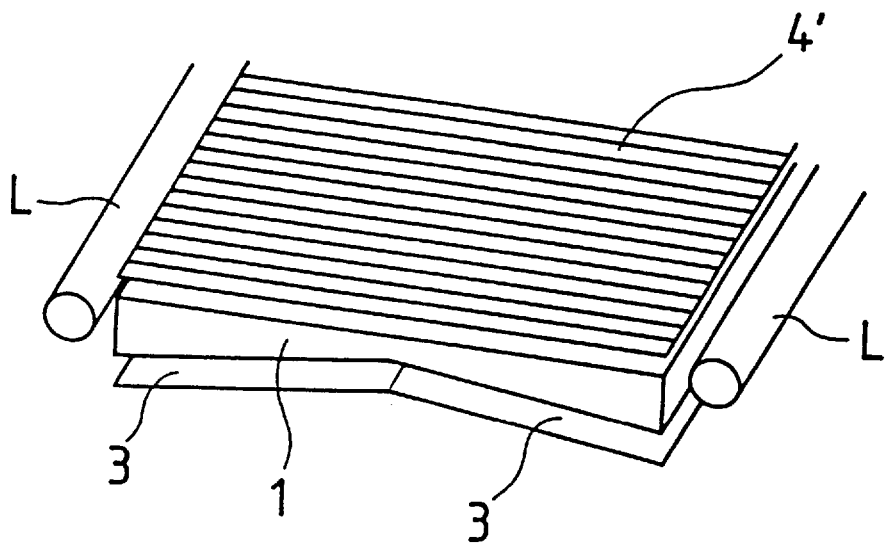
FIG. 12 is a partial sketch for explaining a further modification of the embodiment according to the present invention.

In a modification shown in FIG. 12, a light guide plate 1 of a sectional shape composed of linear wedge shapes facing each other is used and two light source elements L in total are disposed on the opposite ends of the light guide plate.

Figure 13:
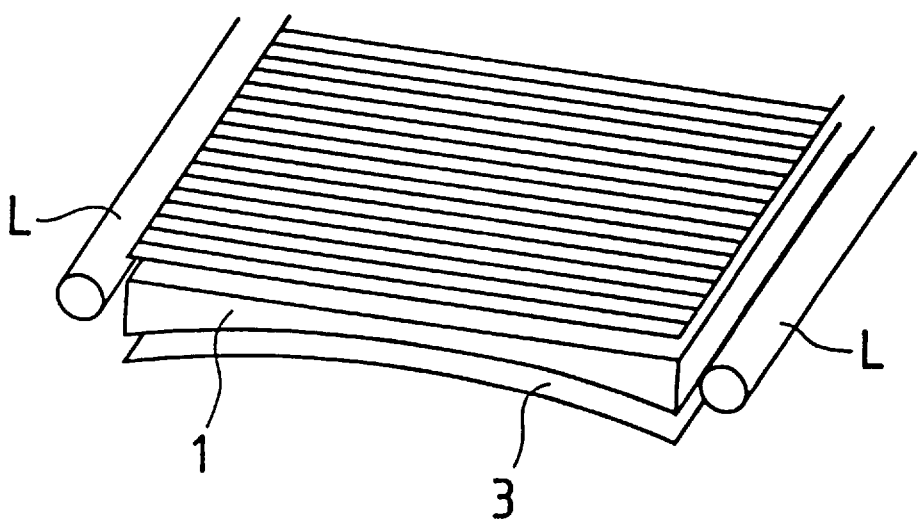
FIG. 13 is a partial sketch for explaining a still further modification of the embodiment according to the present invention.

In a modification shown in FIG. 13, the back surface of a light guide plate 1 has an arch-like shape and two light source elements L in total are disposed on the opposite ends of the light guide plate.

Description will now be on the measurement which shows the fact that the surface light source device of the present invention has excellent characteristics from the viewpoint of the luminance level and angular characteristics.

Figure 8:
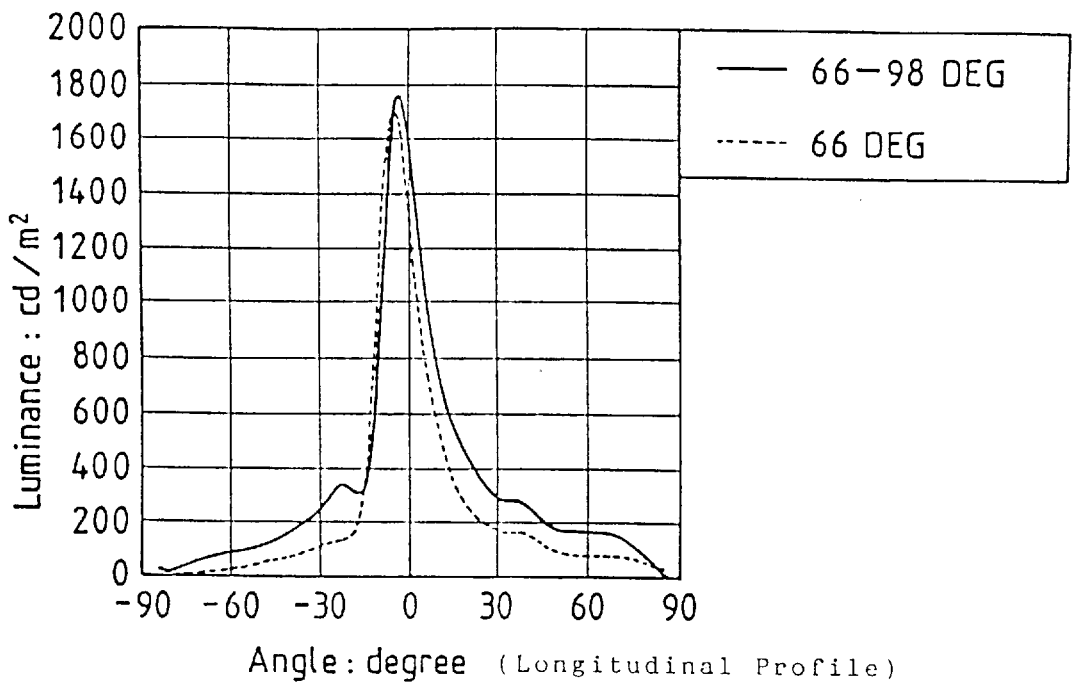
FIG. 8 is a graph showing the result of measurement of luminance characteristics in a longitudinal section with respect to the configuration of the embodiment shown in FIG. 4 and that of the prior art shown in FIG. 1.
Figure 9:
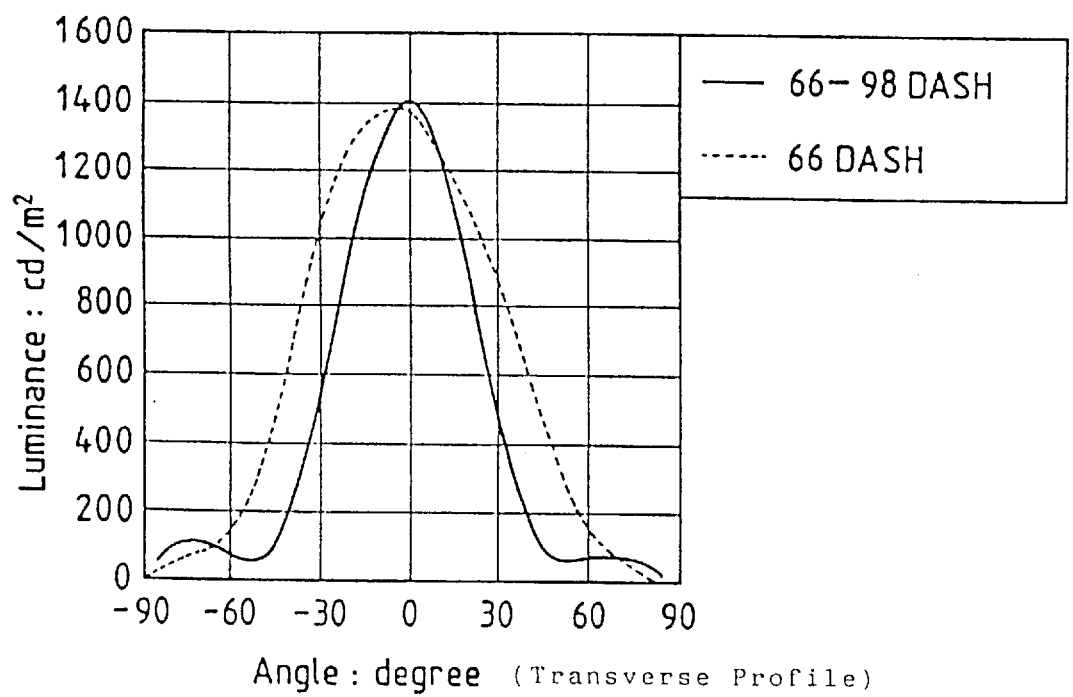
FIG. 9 is a graph showing the result of measurement of luminance characteristics in a transverse section with respect to the configuration of the embodiment shown in FIG. 4 and that of the prior art shown in FIG. 1.

FIGS. 8 and 9 are graphs showing the state, in which the luminance varies by using the prism sheet 4' in the embodiment shown in FIG. 4, in comparison with a case using the prism sheet 4 (the conventional structure shown in FIG. 1).

Referring to both the graphs, the axis of ordinate represents the luminance of a luminant surface (the outside surface of each of the prism sheets 4, 4') as the result of measurement in $cd/m^2$, where the axis of abscissa represents the direction of measurement of luminance (the gazing direction of luminance meter).

In FIG. 8, the angle of measurement of the luminance was scanned in the longitudinal section of the light guide plate 1. On the other hand, in FIG. 9, the angle of measurement of the luminance was scanned in the transverse section of the light guide plate 1. In either graph where angle of 0° corresponds to the frontal direction.

In both the graphs, a solid line represents the result of measurement in the embodiment and a broken line represents the result of measurement in the conventional structure.

In the prism sheet of the embodiment, a prism vertical angle $\phi 3$ on the inside surface was set to 66° and a prism vertical angle $\phi 4$ on the outside surface was set to 98°. In the prior art, a prism vertical angle $\phi 3$ on the inside surface was set to 66° (the outside surface is flat).

The light guide plate 1, the light source element L and the reflector 3 or the like used in the embodiment were all the same as those in the prior art, except for the prism sheet. The following facts are given in view of these results of measurement.

(1) In any of the graphs in FIGS. 8 and 9, even if the prism sheets 4, 4' are exchanged, there is no large change in the overall shape of the graphs.

(2) As seen from the graph in FIG. 8, by the use of the prism sheet 4', the luminance in around the frontal direction in the longitudinal section of the light guide plate 1 is rather enhanced by about several percents than degraded.

(3) The graph in FIG. 9 shows that light is gathered around the frontal direction in the transverse section of the light guide plate 1 by the use of the prism sheet 4'. This is considered to be based on the converging action of the prism surfaces on the outside surface of the prism sheet 4'.

It is considered from these facts that the structure having the prism sheet 4' provided with the prism rows on the inside and outside surfaces, in place of the prism sheet 4 disposed along the exiting surface of the light guide plate of the surface light source device of conventional type, has characteristics of efficiently radiating an illumination flux in a desired direction (in the frontal direction in this embodiment) without spoiling the overall propagation directional characteristics of the surface light source device of conventional type.

Finally, description will be supplementarily on materials of the prism sheet and the light guide plate a used in the present invention and their manufacturing method.

Various materials with a polymeric material base are available for the prism sheet and the light guide plate used in the present invention. Tables 1 and 2 show typical materials.

TABLE 1

| category | name of polymer | refractive index |
|---|---|---|
| MA | 1. PMMA [polymethyl methacrylate] | 1.49 |
| | 2. PEMA [polyethyl methacrylate] | 1.483 |
| | 3. Poly(nPMA) [poly-n-propyl methacrylate] | 1.484 |
| | 4. Poly(nBMA) [poly-n-butyl methacrylate] | 1.483 |
| | 5. Poly(nHMA) [poly-n-hexyl methacrylate] | 1.481 |
| | 6. Poly(iPMA) [polyisopropyl methacrylate] | 1.473 |
| | 7. Poly(iBMA) [polyisobutyl methacrylate] | 1.477 |
| | 8. Poly(tBMA) [poly-t-butyl methacrylate] | 1.463 |
| | 9. PCHMA [polycyclohexyl methacrylate] | 1.507 |
| XMA | 10. PBzMA [polybenzyl methacrylate] | 1.568 |
| | 11. PPhMA [polyphenyl methacrylate] | 1.57 |
| | 12. Poly(1-PhEMA) [poly-1-phenylmethyl methacrylate] | 1.543 |
| | 13. Poly(2-PhEMA) [poly-2-phenylethyl methacrylate] | 1.559 |
| | 14. PFFMA [polyfurfuryl methacrylate] | 1.538 |
| A | 15. PMA [polymethyl acrylate] | 1.4725 |
| | 16. PEA [polyethyl acrylate] | 1.4685 |
| | 17. Poly(nBA) [poly-b-butyl acrylate] | 1.4535 |
| XA | 18. PBzMA [polybenzyl acrylate] | 1.5584 |
| | 19. Poly(2-ClEA) [poly-2-chloroethyl acrylate] | 1.52 |

TABLE 2

| category | name of polymer | refractive index |
|---|---|---|
| AC | 20. PVAc [polyvinyl acetate] | 1.47 |
| XA | 21. PVB [polyvinyl benzoate] | 1.578 |
| | 22. PVAc [polyvinyl phenyl acetate] | 1.567 |
| | 23. PVClAc [polyvinyl chloroacetate] | 1.512 |
| N | 24. PAN [polyacrylonitrile] | 1.52 |
| | 25. Poly(αMAN) [poly-α-methyl acrylonitrile] | 1.52 |
| α-A | 26. PMA(2Cl) [polymethyl-α-chloroacrylate] | 1.5172 |
| St | 27. Poly(o-ClSt) [poly-o-chlorostyrene] | 1.6098 |
| | 28. Poly(p-FSt) [poly-p-fluorostyrene] | 1.566 |
| | 29. Poly(o, p-FSt) [poly-o-, p-diflurostyrene] | 1.475 |
| | 30. Poly(p-iPSt) [poly-p-isopropyl styrene] | 1.554 |
| | 31. PSt [polystyrene] | 1.59 |
| C | 32. PC (polycarbonate] | 1.59 |

Since a prism sheet is usually a transparent member, the above materials may be used as they are. If the flat surface of the prism sheet is formed by mat finish, a well-known blasting process or the like may be applied. Further, a well-known plastic film forming technique may be applied to the formation of V-shaped grooves to provide a prism vertical angle of a predetermined value. A light guide plate with a polymeric material base may be manufactured by the following methods.

One of the methods makes the use of a forming process including a step of kneading two or more kinds of polymers. First, two or more kinds of polymeric materials different from each other in refractive index are kneaded together (kneading step) by mixing and heating. The polymeric materials used in this process may be in an arbitrary shape. Polymeric materials in the shape of pellet, for instance, are readily obtained, and therefore, preferably used.

A light guide plate formed by the steps of injecting the kneaded liquid material into a mold of an injection molding machine at high pressure, and then solidifying the injected material by cooling is extracted from the mold, and as a result, a light guide plate of a shape corresponding to that of the mold may be obtained.

Since two or more kinds of kneaded polymers different from each other in refractive index are solidified without completely being mixed together, these polymers are fixed with their local density uneven (fluctuation), and uniform scattering power is provided. Further, the kneaded material is injected into a cylinder of an extruder and is then extruded according to a normal method, and as a result, an objective mold may be obtained.

The combination and mixing ratio of these polymer blends may be selected in a very wide range and may be determined in consideration of a difference in refractive index, and of the intensity and properties of a structure having uneven refractive index and produced by a forming process (a scattered radiation parameter E, a correlation distance a, and an average of the square of fluctuation of a dielectric constant or the like). Incidentally, typical materials among available polymeric materials are as shown in the above Tables 1 and 2.

Another method of manufacturing a material, which forms a light guide plate, is to uniformly distribute a particle-shaped material of different refractive index (a difference in refractive index is not less than 0.001) into a polymeric material.

One of the methods available for uniform distribution of particle-shaped material includes a method which is called suspension polymerization. According to this method, a particle-shaped material is mixed in a monomer, polymerization is then performed with the above mixed material suspended in molten bath and a polymeric material containing the particle-shaped material in a uniformly distributed state is produced. If a forming technique is applied using this polymeric material as an original material, a light guide plate of a desired shape is manufactured.

Further, it is preferable that a plurality of kinds of materials are prepared by applying suspension polymerization to a particle-shaped material and a monomer in various combinations (combinations of density of particles, particle size and refractive index or the like). When these prepared materials are selectively blended and a forming technique is applied to the blended material, a light guide plate having diverse characteristics may be manufactured. When a polymer containing no particle-shaped material is blended, the density of particles may be easily controlled.

According to still another method available for uniform distribution of particle-shaped material, a polymeric material and a particle-shaped material are kneaded together. In this case, it is also preferable that materials are prepared by kneading and forming (pelletizing) a particle-shaped material and a polymer in various combinations (combinations of density of particles, particle size and refractive index or the like). When these prepared materials are selectively blended and a forming technique is applied to the blended material, a light guide plate having diverse characteristics may be manufactured.

Further, the above polymer blend method and the method of mixing a particle-shaped material may be combined with each other. For instance, when polymers different from each other in refractive index are kneaded by blending, a particle-shaped material may be added. Since these various methods themselves are well-known, the details of manufacturing conditions or the like may be omitted.

As has been described in detail, according to the present invention, it is possible to provide a surface light source device, which has a simple structure using a single prism sheet with high in level of brightness, less reflective appearance and improved visual feeling (whiteness and softness) of a ruminant surface.

Further, when this surface light source device is applied to back lighting, it is possible to provide a liquid crystal display which is excellent in not only power-saving properties but also visual quality.

We claim:

1. A surface light source device, comprising:
   a light guide plate made of light scattering and guiding material,
   a light source to supply light from at least one side direction of said light guide plate,
   a reflector disposed along a back surface of said light guide plate, and
   a prism sheet disposed along an exiting surface of said light guide plate,
   wherein said prism sheet has as an outside prism surface and an inside prism surface respectively provided with a large number of prism rows;
   the prism rows formed on said inside prism surface running in a direction perpendicular to a light supply direction from said light source while having a prism vertical angle such that light making propagation in a preferential propagation direction of luminous flux emitted from said light guide plate is led to around a frontal direction within said prism sheet; and
   the prism rows formed on said outside prism surface running in a direction parallel to the light supply direction from said light source while having a prism vertical angle such that beams led to around the frontal direction within said prism sheet are returned toward said inside surface after having been shifted in a direction substantially perpendicular to said light supply direction.

2. A surface light source device according to claim 1, wherein said light guide plate has a wedge-shaped section and said light source is disposed along a end surface on a thick side of said light guide plate.

3. A surface light source device according to claim 1, wherein each prism vertical angle of the prism rows formed on said outside prism surface is about 90°.

4. A surface light source device according to claim 1, wherein each prism vertical angle of the prism rows formed on said outside prism surface is in the range of 70° to 130°.

5. A liquid crystal display, comprising:
   a liquid crystal panel, and
   a surface light source device disposed to backlight said liquid crystal panel,
   wherein said surface light source device includes a light guide plate made of light scattering and guiding material, a light source to supply light from at least one side direction of said light guide plate, a reflector disposed along a back surface of said light guide plates and a prism sheet disposed along an exiting surface of said light guide plate;
   said prism sheet has as an outside prism surface and an inside prism surface respectively provided with a large number of prism rows;
   the prism rows formed on said inside prism surface running in a direction perpendicular to a light supply direction from said light source while having such a prism vertical angle that light making propagation in a preferential propagation direction of luminous flux emitted from said light guide plate is led to around a frontal direction within said prism sheet; and
   the prism rows formed on said outside prism surface running in a direction parallel to the light supply direction from said light source while having such a prism vertical angle that beams led to around the frontal direction within said prism sheet are returned toward said inside surface after having been shifted in a direction substantially perpendicular to said light supply direction.

6. A liquid crystal display according to claim 5, wherein said light guide plate has a wedge-shaped section, and said light source is disposed along a end surface on the thick side of said light guide plate.

7. A liquid crystal display according to claim 5, wherein each prism vertical angle of the prism rows formed on said outside prism surface is about 90°.

8. A liquid crystal display according to claim 5, wherein each prism vertical angle of the prism rows formed on said outside prism surface is in the range of 70° to 130°.

* * * * *

UNITED STATES PATENT AND TRADEMARK OFFICE
CERTIFICATE OF CORRECTION

PATENT NO. : 5,887,964
DATED : Mar. 30, 1999
INVENTOR(S) : Eizaburo Higuchi, et al It is certified that error appears in the above-indentified patent and that said Letters Patent is hereby corrected as shown below:

Title page [75], change "Setagaya-ku" to --Tokyo--;
           delete "534-23, Ichigao-cho, Aoba-ku,";
           delete "-shi";
           delete "Kanagawa";

Col. 2, line 31, change "600" to --60--.

Col. 4, line 63, delete "," (second occurrence).

Signed and Sealed this

Second Day of November, 1999

Q. TODD DICKINSON

Attest:

Attesting Officer

Acting Commissioner of Patents and Trademarks